US012626830B2

(12) United States Patent
Kwon et al.

(10) Patent No.: US 12,626,830 B2
(45) Date of Patent: May 12, 2026

(54) METHOD OF SYNTHESIZING REACTOR CORE POWER DISTRIBUTION FOR REACTOR CORE PROTECTION SYSTEM BASED ON IN-CORE INSTRUMENT SIGNAL USING ORDINARY KRIGING METHOD

(71) Applicant: KEPCO NUCLEAR FUEL CO., LTD., Daejeon (KR)

(72) Inventors: Young Min Kwon, Daejeon (KR); Byung Chan Baek, Daejeon (KR); Dong-su Kim, Daejeon (KR); Wook Lee, Sejong (KR); Do-young Oh, Sejong (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 398 days.

(21) Appl. No.: 18/270,200

(22) PCT Filed: Dec. 30, 2021

(86) PCT No.: PCT/KR2021/020242

§ 371 (c)(1),
(2) Date: Jun. 28, 2023

(87) PCT Pub. No.: WO2023/128005

PCT Pub. Date: Jul. 6, 2023

(65) Prior Publication Data

US 2024/0404720 A1 Dec. 5, 2024

(30) Foreign Application Priority Data

Dec. 28, 2021 (KR) ........................ 10-2021-0189347

(51) Int. Cl.
*G21C 17/108* (2006.01)
*G21D 3/00* (2006.01)

(52) U.S. Cl.
CPC ........... *G21C 17/108* (2013.01); *G21D 3/001* (2013.01)

(58) Field of Classification Search
CPC .............................. G21C 17/108; G21D 3/001
(Continued)

(56) References Cited

U.S. PATENT DOCUMENTS 4,839,134 A * 6/1989 Impink .................. G21C 17/10 376/254
2016/0300630 A1 10/2016 Park et al.

FOREIGN PATENT DOCUMENTS

KR 10-0009517 B1 3/1981
KR 10-2001-0039442 A 5/2001
(Continued)

OTHER PUBLICATIONS

Xingjie Peng et al. "A new power mapping method based on ordinary kriging and determination of optimal detector location strategy", Annals of Nuclear Energy, vol. 68, pp. 118-123, Feb. 2, 2014.

*Primary Examiner* — Jack W Keith
*Assistant Examiner* — Daniel Wasil
(74) *Attorney, Agent, or Firm* — You & IP, LLC

(57) ABSTRACT

A method of synthesizing reactor core power distribution is disclosed. According to the method, the power of all fuel assemblies in a reactor core is calculated from powers of fuel assemblies in which in-core instruments are located using the ordinary kriging methodology. Also, a hot-pin power distribution of each fuel assembly is synthesized from the power of all fuel assemblies calculated, whereby more accurate hot-pin axial power distribution, rather than pseudo hot-pin axial power distribution, may be synthesized.

4 Claims, 3 Drawing Sheets

(58) Field of Classification Search
USPC .................................................. 376/254, 259
See application file for complete search history.

(56) References Cited

FOREIGN PATENT DOCUMENTS

| | | | | | |
|---|---|---|---|---|---|
| KR | 101083155 | B1 | * | 11/2011 | ............. G21C 17/10 |
| KR | 10-1614772 | B1 | | 4/2016 | |
| KR | 10-1651893 | B1 | | 8/2016 | |
| KR | 10-2123236 | B1 | | 6/2020 | |
| KR | 10-2021-0075257 | A | | 6/2021 | |

* cited by examiner

METHOD OF SYNTHESIZING REACTOR CORE POWER DISTRIBUTION FOR REACTOR CORE PROTECTION SYSTEM BASED ON IN-CORE INSTRUMENT SIGNAL USING ORDINARY KRIGING METHOD

STATEMENT REGARDING SPONSORED RESEARCH

This invention was supported by the Korea Institute of Energy Technology Evaluation and Planning (KETEP) and the Ministry of Trade, Industry & Energy (MOTIE) of the Republic of Korea under the project Number 20206510100040.

TECHNICAL FIELD

The present disclosure relates to a method of synthesizing reactor core power distribution using an in-core instrument in a reactor core protection system and, more particularly, to a method of synthesizing based on reactor core power distribution for a reactor core protection system using an ordinary kriging method.

BACKGROUND ART

In order to keep a nuclear reactor safe, it is very important to monitor and check a state of the reactor in real time, so it is required for the reactor to meet strict requirements from a design stage. In particular, in order to monitor axial power distribution of a reactor core in real time, a plurality of ex-core neutron flux detectors disposed along the perimeter of the reactor is provided at three levels (an upper part, a middle part, and a lower part) along an axial direction of the reactor core, whereby the axial power distribution of a reactor core is synthesized on the basis of ex-core neutron flux detector signals of three levels, which are measured through the ex-core neutron flux detectors.

As such, as shown in Korean Patent No 10-0009517, conventional core protection system axial power distribution synthesis calculates power of outer region of core of three levels using the ex-core neutron flux signal measured by an ex-core neutron flux measurement system in an outer region inside the reactor, and on the basis of the calculated power of outer region of core, average power of outer section of core of three levels is calculated by reflecting a control rod shadow coefficient, and on the basis of this, axial power distribution of a core average of the number of 20 is synthesized using a Cubic Spline function.

FIG. 1 is a view showing a conceptual diagram of a core protection and monitoring system. As shown in FIG. 1, the axial power distribution in a core average calculated is the average across the core, so a pseudo hot-pin power distribution is calculated by multiplying by a radial peak coefficient Fxy. The radial peak coefficient is installed in the core protection system database in a form of a look-up table, thereby being used after being loaded from the database according to a control rod insertion state.

According to Korean Patent No. 10-1614772, an artificial neural network-based method of synthesizing power distribution for a core protection system is composed of an input layer, an output layer, and at least one hidden layer, wherein each layer includes at least one node. Here, each node uses a neural network circuit to determine an optimal connection strength between each of the nodes constituting the neural network circuit through learning based on various core design data applied to the reactor core design of a nuclear power plant, thereby being constituted to synthesize the axial power distribution of the reactor core based on the ex-core neutron flux detector signal measured through the ex-core neutron flux detector during the operation of the reactor, wherein the neural network circuit is configured to have therein nodes each of which is connected to a node of another layer, but the connection between the nodes is made such that strength of each connection varies according to the learning result.

The method of obtaining the pseudo hot-pin power distribution by synthesizing the axial power distributions of the core average of the number of 20 using ex-core neutron flux signals and multiplying by the radial peak coefficient gives a margin calculated less than an actual one due to the excessively conservative reflection of the radial peak coefficient. Accordingly, the operation of the nuclear reactor may be restricted even though the actual operation margin is sufficient.

Documents of Related Art (Patent Document)

Patent Document 1. Korean Patent No. 10-0009517 (Mar. 23, 1981)

Patent Document 2. Korean Patent No. 10-1614772 (Apr. 18, 2016)

DISCLOSURE

Technical Problem

Accordingly, the present disclosure has been made keeping in mind the above problems occurring in the related art, and an objective of the present disclosure is to provide such that calculating a power of all fuel assemblies using an ordinary kriging method from powers of fuel assemblies where in-core instruments are located and synthesizing a hot-pin power distribution of each fuel assembly from the power of all fuel assemblies calculated.

Technical Solution

In order to accomplish the above objective, there may be provided a method of synthesizing reactor core power distribution for a reactor core protection system based on an in-core instrument signal using an ordinary kriging method according to one aspect of the present disclosure, the method including steps of: (a) calculating a power of all fuel assemblies in a reactor core from powers of fuel assemblies where in-core instruments are located using the ordinary kriging method; (b) obtaining axial power distribution of a certain node for each fuel assembly by artificial neural network synthesis of axial power distribution based on results of step (a); and (c) obtaining hot-pin power distribution of the fuel assembly by multiplying the axial power distribution of (b) by a 1-pin correlation factor obtained from a reactor core design code and a ratio of powers of the fuel assemblies to average power of the reactor core for each node.

Advantageous Effects

As described above, according to a method of synthesizing based on reactor core power distribution for a reactor core protection system using an ordinary kriging method of the present disclosure, a power of all fuel assemblies in a reactor core is calculated from powers of fuel assemblies where in-core instruments are located using the ordinary kriging methodology, whereby there is an effect that more accurate hot-pin axial power distribution, rather than pseudo hot-pin axial power distribution, can be synthesized.

BEST MODE

Specific structural or functional descriptions presented in the embodiments of the present disclosure are merely exemplified for the purpose of explaining embodiments according to the concept of the present disclosure, and embodiments according to the concept of the present disclosure may be implemented in various forms. In addition, the descriptions presented should not be construed as being limited to the embodiments described in the present specification but should be understood to include all modifications, equivalents, or substitutes included in the spirit and scope of the present disclosure.

Meanwhile, in the present disclosure, terms such as first and/or second may be used to describe various elements, but the elements are not limited to the above terms. The above terms are used only for the purpose of distinguishing one component from other components, for example, within a range not departing from the scope of rights according to the concept of the present disclosure, a first component may be referred to as a second component, and similarly, the second component may also be referred to as the first component.

Hereinafter, embodiments of the present disclosure will be described with reference to the accompanying drawings. In describing the embodiments of the present disclosure, when it is determined that a description of a related known function or configuration may unnecessarily obfuscate the gist of the present disclosure, the description is omitted.

Figure 1:
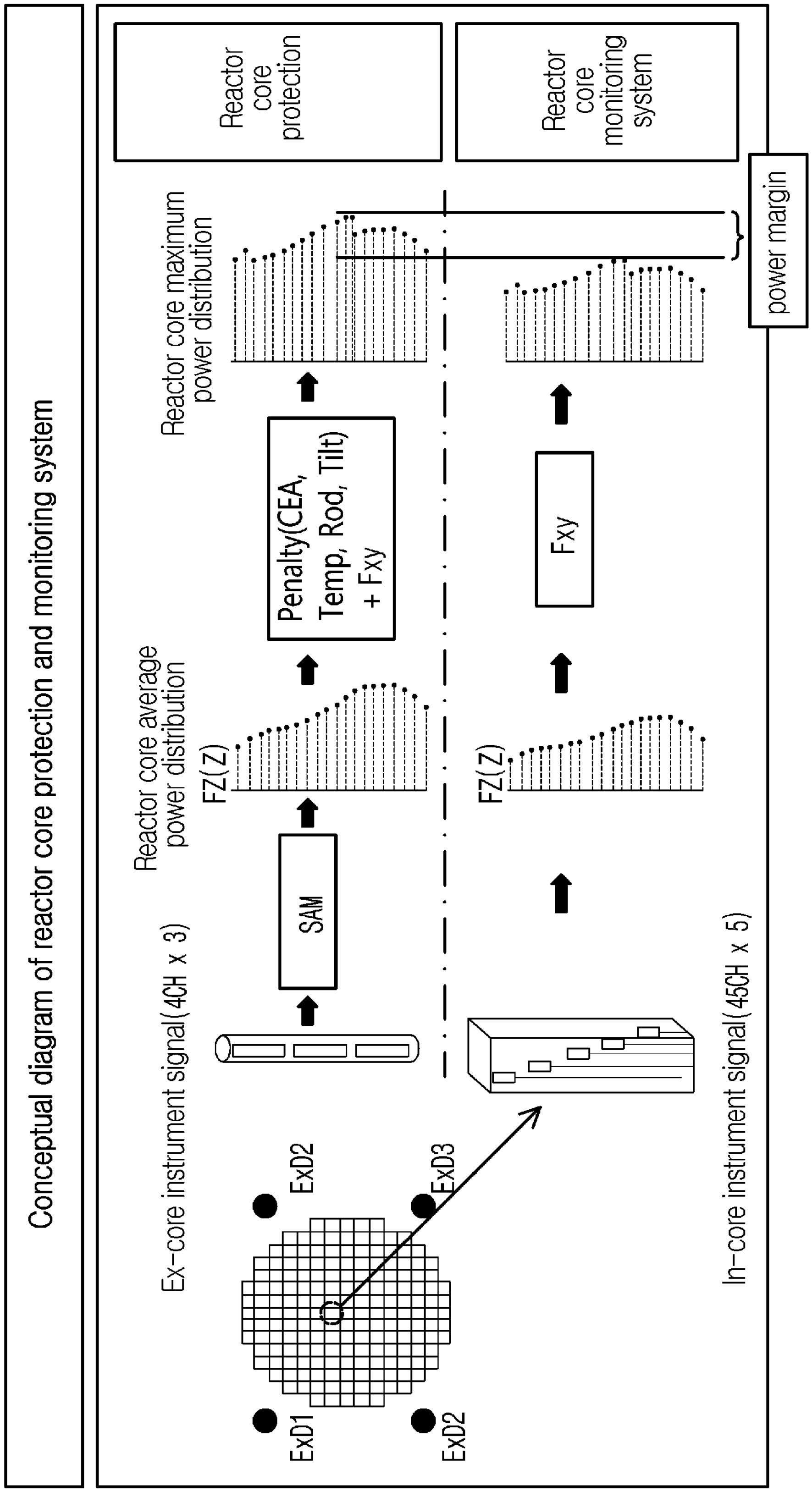
FIG. 1 is a view showing a conceptual diagram of a core protection and monitoring system.
Figure 2:
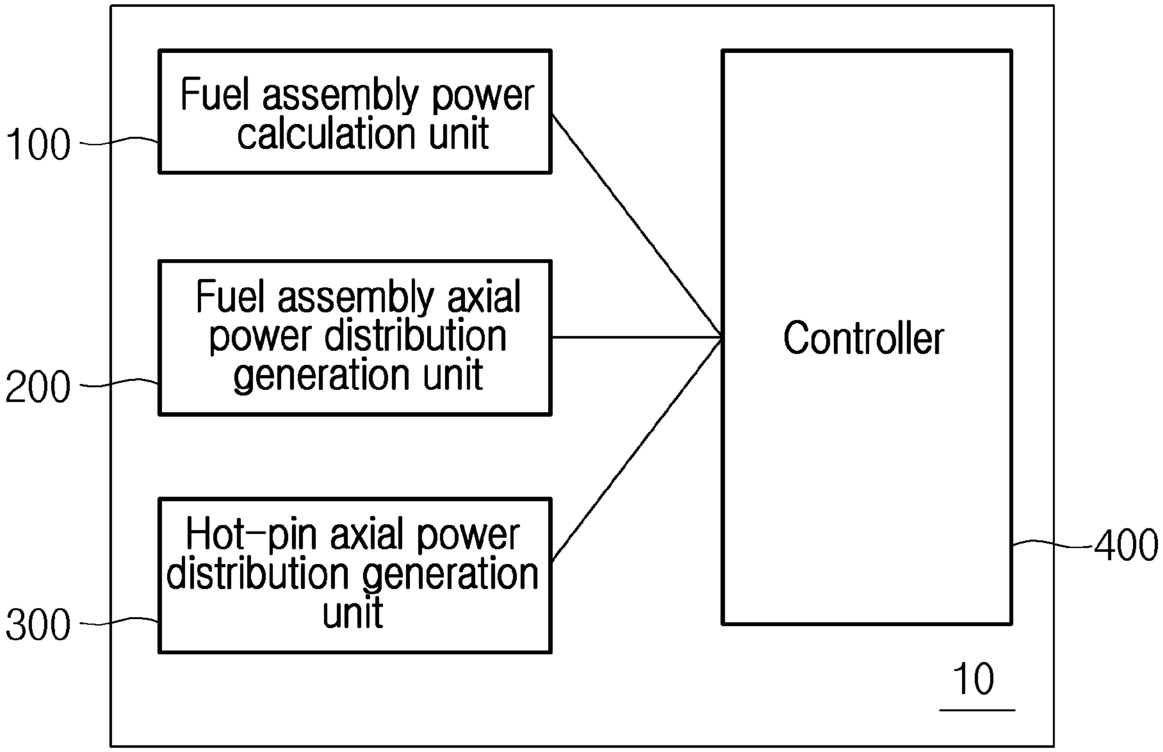
FIG. 2 is a block diagram showing a system configuration for a method of synthesizing based on reactor core power distribution for a reactor core protection system using an ordinary kriging method according to an embodiment of the present disclosure.

FIG. 2 is a block diagram showing a system configuration for a method of synthesizing based on reactor core power distribution for a reactor core protection system using an ordinary kriging method according to an embodiment of the present disclosure. As shown in FIG. 2, a system 10 for the method of synthesizing based on reactor core power distribution for a reactor core protection system using an ordinary kriging method according to an embodiment of the present disclosure includes a fuel assembly power calculation unit 100, a fuel assembly axial power distribution generation unit 200, a hot-pin axial power distribution generation unit 300, and a controller 400.

The fuel assembly power calculation unit 100 calculates the power of all fuel assemblies in the core from the powers of fuel assemblies in which in-core instruments are located using the ordinary kriging method. Such a fuel assembly power calculation unit calculates a power at a predicted point of the reactor core as weighted values for surrounding values of the power which are already known and, on the basis of the weighted values obtained, predicts the power of a specific fuel assembly in the reactor core in a weighted linear combination of the power values of the fuel assemblies, which are in the surrounding of the specific fuel assembly and in which in-core instruments are located, thereby performing a function of obtaining the power of all the fuel assemblies within the reactor core.

The fuel assembly power calculation unit 100 according to the present embodiment may calculate weighted values that minimize error variance, obtain weighted values of in-core instruments in the surroundings at the prediction point, and obtain powers of five levels of all fuel assemblies in the core.

The fuel assembly power calculation unit 100 according to the present embodiment determines the power of the fuel assembly where the in-core instrument is not located by multiplying the value predicted by calculating the weighted values to the power of the fuel assembly where the in-core instruments are located by the power correction factor that is based on the design value. Here, the design value is a fuel assembly power that is a true value calculated from a core design code.

The fuel assembly axial power distribution generation unit 200 is configured to obtain an axial power distribution of a certain node for each fuel assembly by artificial neural network synthesis of an axial power distribution, with the result of the fuel assembly power calculation unit 100.

The hot-pin axial power distribution generation unit 300 is configured to obtain the hot-pin power distribution of the fuel assembly by multiplying a 1-pin correlation factor obtained from the core design code, for each node, and a ratio of the power of the fuel assembly to the average power of the core, to the result of the fuel assembly axial power distribution generation unit 200.

The controller 400 is configured to control the fuel assembly power calculation unit 100, the axial fuel assembly power distribution generation unit 200, and the hot-pin axial power distribution generation unit 300 and calculate the power distribution of the hot-pin, which has the largest value among all fuel assembly power powers, and the peak power value in the reactor core.

Figure 3:
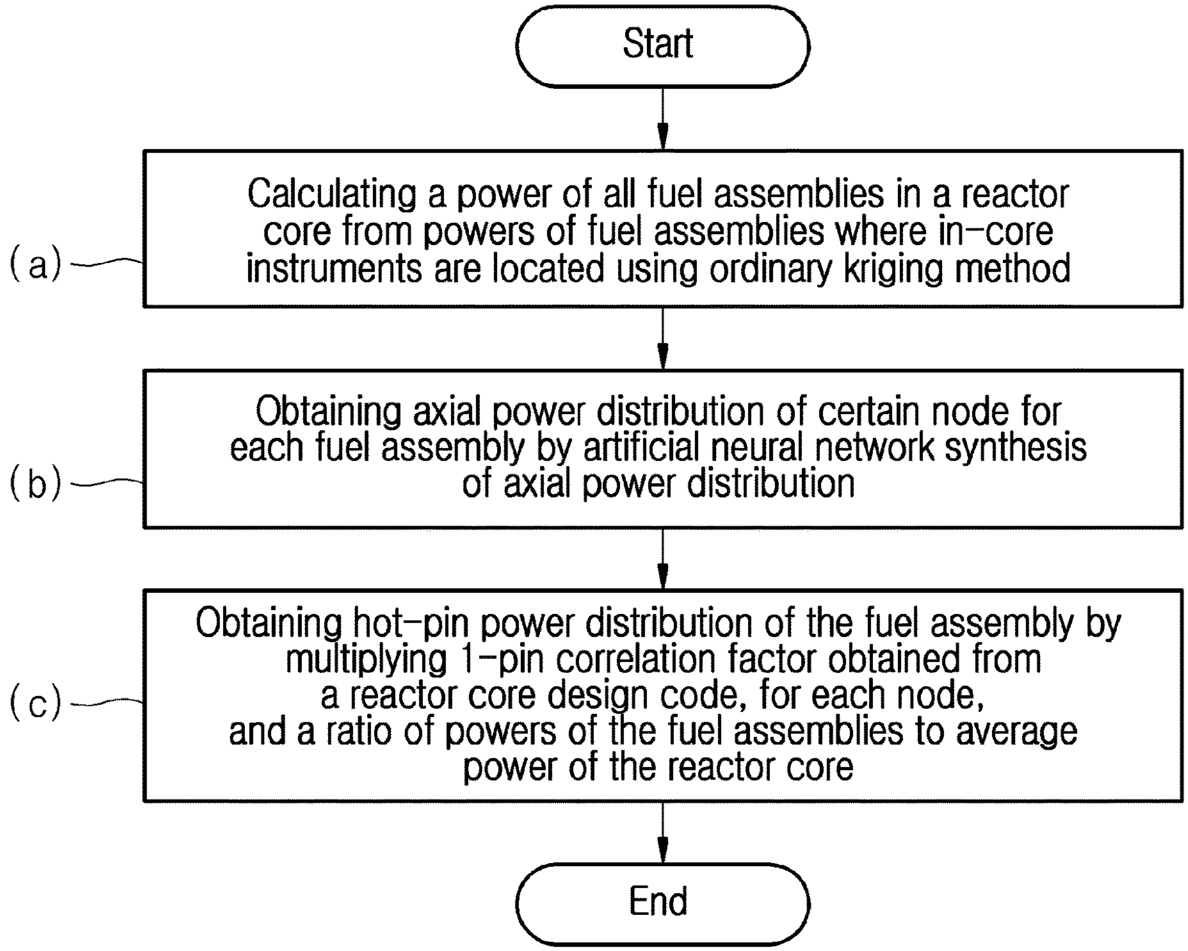
FIG. 3 is a flowchart showing the method of synthesizing based on reactor core power distribution for a reactor core protection system using an ordinary kriging method according to an embodiment of the present disclosure.

FIG. 3 is a flowchart showing the method of synthesizing based on reactor core power distribution for a reactor core protection system using an ordinary kriging method according to an embodiment of the present disclosure. As shown in FIG. 3, the controller of the system for a method of synthesizing based on reactor core power distribution for a reactor core protection system using an ordinary kriging method calculates in step (a) the power of all fuel assemblies in the reactor core from the powers of the in-core instruments using the ordinary kriging method. Next, the controller obtains in step (b) the axial power distribution of a certain node for each fuel assembly by artificial neural network synthesis of axial power distribution based on results of step (a). Next, the controller obtains in step (c) the hot-pin power distribution of the fuel assembly by multiplying the axial power distribution of (b) by the 1-pin correlation factor obtained from the reactor core design code and a ratio of the powers of the fuel assemblies to the average power of the core for each node.

Step (a) includes calculating weighted values for known surrounding power values of a point of the reactor core and predicting a power of a specific fuel assembly in the reactor core by a weighted linear combination of the power values of the in-core instruments in the surroundings based on the weighted values obtained above.

In addition, in step (a), the weighted values are minimizing error variance, and the power of the fuel assembly without the in-core instrument is determined by multiplying the value predicted by calculating the weighted values and the power of the fuel assembly with the in-core instruments by the power correction factor that is based on the fuel assembly power (design value) calculated from the core design code.

In addition, in step (c), the hot-pin power of a fuel assembly-specific node is calculated by multiplying axial power distribution of a specific fuel assembly, the ratio of power of the fuel assembly to the average power of the reactor core, and a 1-pin correlation factor corresponding to a specific node of the fuel assembly, as in the following equation.

$$PD_{jl} = FZ_{jl} \times \frac{\sum_{k=1}^{5} P_{jk}}{P_{AVG}} \times \left[\frac{1-\text{pin}}{RPF}\right]_{jl}, , \quad \text{[Equation]}$$

wherein $PD_{jl}$ is the hot-pin power of an $l^{th}$ node of a $j^{th}$ fuel assembly, $FZ_{jl}$ is axial power distribution of the $j^{th}$ fuel assembly, $P_{AVG}$ is average power of an entire core, and $[(1-\text{Pin})/RPF]_{jl}$ is a 1-pin correlation factor corresponding to the $l^{th}$ node of the $j^{th}$ fuel assembly.

According to the present disclosure, in the core protection system, the powers of all the fuel assemblies in the reactor core are calculated from the powers of the fuel assemblies where the in-core instruments are located using the normal kriging method, and the hot-pin power distribution of each of the fuel assemblies is synthesized from the calculated powers of the fuel assemblies, whereby there is an effect that more accurate hot-pin axial power distribution, rather than pseudo hot-pin axial power distribution, may be synthesized.

Hereinafter, a detailed description according to an embodiment of the present disclosure will be presented.

The kriging methodology is a technique that predicts the specific value at a prediction point with a weighted linear combination of surrounding values that are already known. Using this, the power at the prediction point is predicted as a combination of the power values of the in-core instruments in the surrounding. When expressed as an equation, the equation is the same as Equation 1.

$$\tilde{Z}_J = \sum_{i=1}^{n} \lambda_i Z_i, \quad \text{[Equation 1]}$$

wherein, $\tilde{Z}_{\iota}$ is a predicted power value at a point j, $\lambda_i$ is a weighted value of an $i^{th}$ in-core instrument at the point j, and $Z_i$ is a power value of the $i^{th}$ in-core instrument.

The kriging methodology obtains weighted values that minimize error variance and calculates the predicted power value to be close to the true value. At this time, with the weighted values having a condition of not being biased, a sum of the weighted values at one point is to be made to be 1. With this condition, the weighted values that minimize the error variance, which is calculated as in Equation 2, are calculated.

$$\sigma_{OK}^2 = \sum_{i=1}^{n}\sum_{i=1}^{n} \lambda_i \lambda_j \sigma_{ij}^2 - 2\sum_{i=1}^{n} \lambda_i \sigma_{0i}^2 + \sigma^2, \quad \text{[Equation 2]}$$

wherein $$\sigma_{OK}^2$$

is a kriging error variance value, $$\sigma_{ij}^2$$

is a covariance value of an $i^{th}$ in-core instrument and a $j^{th}$ in-core instrument, and $$\sigma_{0i}^2$$

is a covariance value of a prediction point and the $i^{th}$ in-core instrument.

When mathematically expressed using the Lagrange factor method, Equation 2 is equivalent to Equation 3. Here, since the sum of the weighted values is 1, the value of the expression added is zero which gives no effect.

$$L(\lambda_1, \lambda_2, \ldots, \lambda_n; \omega) = \sum_{i=1}^{n}\sum_{j=1}^{n} \lambda_1 \lambda_k \sigma_{ij}^2 - 2\sum_{i=1}^{n} \lambda_1 \sigma_{0i}^2 + \sigma^2 - 2\omega\left(1 - \sum_{i=1}^{n} \lambda_i\right), \quad \text{[Equation 3]}$$

wherein ω is a Lagrange factor.

Using the fact that a differential value at the local extremum of the function is zero, Equation 3 is solved. The partial differential of Equation 3 with respect to each of λ and ω yields Equations 4 and 5.

$$\frac{\partial L}{\partial \lambda_l} = 2\sum_{i=1}^{n} \lambda_i \sigma_{il}^2 - 2\sigma_{0l}^2 + 2\omega = 0 \quad \text{[Equation 4]}$$

$$\frac{\partial L}{\partial \omega} = 2\left(1 - \sum_{i=1}^{n} \lambda_i\right) = 0 \quad \text{[Equation 5]}$$

When this is solved as a matrix equation, the kriging equation for obtaining the weighted values may be obtained as Equation 6.

$$\begin{bmatrix} \sigma_{11}^2 & \cdots & \sigma_{1n}^2 & 1 \\ \vdots & \ddots & \vdots & \vdots \\ \sigma_{n1}^2 & \cdots & \sigma_{nn}^2 & 1 \\ 1 & \cdots & 1 & 0 \end{bmatrix} \begin{bmatrix} \lambda_1 \\ \vdots \\ \lambda_N \\ \omega \end{bmatrix} = \begin{bmatrix} \sigma_{01}^2 \\ \vdots \\ \sigma_{0n}^2 \\ 1 \end{bmatrix} \quad \text{[Equation 6]}$$

The covariance function used in the kriging equation uses the form of a quadratic autoregressive function (Equation 7). The size of the covariance in this function is determined depending on the distance between the two points.

$$\sigma_{ij}^2 = \sigma^2\left(\left(1 + \frac{\|x_i - x_j\|}{L}\right)e^{-\frac{\|x_i - x_j\|}{L}}\right), \quad \text{[Equation 7]}$$

wherein $x_i$ is a location of an $i^{th}$ in-core instrument, and L is a correlation distance. The correlation distance L is a certain distance at which correlation is no longer observed.

The power of the fuel assembly where no in-core instrument is located is determined by multiplying the value predicted by calculating the weighted values to the power of the fuel assembly where the in-core instruments are located and the power correction factor that is based on the power of the fuel assembly, which is the true value calculated from the core design code.

$$P_{jk} = PCF_j \sum_{i=1}^{n} w_{ij} P_{ik}^{mea}, \quad \text{[Equation 8]}$$

wherein $P_{jk}$ is a calculated power of a $k^{th}$ level of a $j^{th}$ fuel assembly, $w_{ij}$ is a weighted value for an $i^{th}$ in-core instrument of the $j^{th}$ fuel assembly, $PCF_j$ is a power correction factor of the $j^{th}$ fuel assembly, and $$P_{ik}^{mea}$$

is power of a $k^{th}$ level of a fuel assembly where the $i^{th}$ in-core instrument is located.

Hereby, provided powers of five nodes of all fuel assemblies are obtained, the powers are expanded in the axial direction to obtain the axial power distribution of the fuel assembly of a certain node. The extension method uses the existing artificial neural network-based methodology synthesizing axial power distribution. The hot-pin power distribution of the fuel assembly is obtained by multiplying the 1-pin correlation factor obtained from the core design code and the ratio of power of the fuel assembly to average power of an entire core, to each node of the fuel assembly axial power distribution. When expressed as an equation, the equation is the same as Equation 9.

$$PD_{jl} = FZ_{jl} \times \frac{\sum_{k=1}^{5} P_{jk}}{P_{AVG}} \times \left[\frac{1-\text{pin}}{RPF}\right]_{jl}, \quad \text{[Equation 9]}$$

wherein $PD_{jl}$ is the hot-pin power of an $l^{th}$ node of a $j^{th}$ fuel assembly, $FZ_{jl}$ is axial power distribution of the $j^{th}$ fuel assembly, $P_{AVG}$ is average power of an entire core, and $[(1-\text{Pin})/\text{RPF}]_{jl}$ is a 1-pin correlation factor corresponding to the $l^{th}$ node of the $j^{th}$ fuel assembly.

According to the method of synthesizing reactor core power distribution using an in-core instrument in a reactor core protection system of the present disclosure, the power of all the fuel assemblies in the reactor core is calculated from the powers of the fuel assemblies where the in-core instruments are located using the ordinary kriging methodology, whereby there is an effect that more accurate hot-pin axial power distribution, rather than pseudo hot-pin axial power distribution, may be synthesized.

The present disclosure described above is not limited by the above-described embodiments and the accompanying drawings, and it will be apparent to those skilled in the art that various substitutions, modifications, and changes are possible without departing from the technical spirit of the present disclosure.

The invention claimed is:

1. A method of synthesizing reactor core power distribution for a reactor core protection system based on an in-core instrument signal using an ordinary kriging method, the method comprising steps of:

(a) calculating a power of all fuel assemblies in a reactor core from powers of fuel assemblies in which in-core instruments are located using the ordinary kriging method;

(b) obtaining axial power distribution of a node for each fuel assembly by artificial neural network synthesis of axial power distribution based on results of step (a); and (c) obtaining hot-pin power distribution of the node for each fuel assembly by multiplying the axial power distribution of the node obtained in step (b) by a 1-pin correlation factor obtained from a reactor core design code and a ratio of the powers of the fuel assemblies to an average power of an entire reactor core, wherein in step (c), the hot-pin power distribution of the node is calculated by multiplying the axial power distribution of the node by the ratio of a power of the fuel assembly to the average power of the entire reactor core and the 1-pin correlation factor corresponding to the node, as in the following equation, $$PD_{jl} = FZ_{jl} \times \frac{\sum_{k=1}^{5} P_{jk}}{P_{AVG}} \times [(1-\text{pin})/RPF]_{jl}, \quad \text{[Equation]}$$

wherein $PD_{jl}$ is the hot-pin power of an $l^{th}$ node of a $j^{th}$ fuel assembly, $FZ_{jl}$ is the axial power distribution of the $l^{th}$ node of the $j^{th}$ fuel assembly, $P_{jk}$ is a calculated power of a $k^{th}$ level of the $j^{th}$ fuel assembly, $P_{AVG}$ is the average power of the entire reactor core, and $[(1-\text{Pin})/\text{RPF}]_{jl}$ is the 1-pin correlation factor corresponding to the $l^{th}$ node of the $j^{th}$ fuel assembly.

2. The method of claim 1, wherein step (a) comprises calculating weighted values for known surrounding power values of a point of the reactor core, and predicting a power of a specific fuel assembly in the reactor core by a weighted linear combination of the power values of the fuel assemblies, which are in the surrounding of the specific fuel assembly and in which the in-core instruments are located, based on the weighted values calculated.

3. The method of claim 2, wherein the weighted values are calculated to minimize error variance of the power of the specific fuel assembly in the reactor core.

4. The method of claim 1, wherein in the step (a), the power of the fuel assembly in which the in-core instrument is not located is determined by multiplying a value predicted by using weighted values for the powers of fuel assemblies in which the in-core instruments is located by a power correction factor for the fuel assembly obtained from the reactor core design code.

* * * * *